US009322898B2

(12) United States Patent
Kim et al.

(10) Patent No.: US 9,322,898 B2
(45) Date of Patent: Apr. 26, 2016

(54) APPARATUS AND METHOD FOR ESTIMATING DIRECTION OF RADIO FREQUENCY SIGNAL

(71) Applicant: Electronics and Telecommunications Research Institute, Daejeon (KR)

(72) Inventors: Jong-Kyu Kim, Daejeon (KR); Hui-Rae Cho, Daejeon (KR); Jin-Gak Jang, Daejeon (KR); In-Ho Hwang, Daejeon (KR); Chun-Soo Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 449 days.

(21) Appl. No.: 13/918,678

(22) Filed: Jun. 14, 2013

(65) Prior Publication Data

US 2014/0152505 A1    Jun. 5, 2014

(30) Foreign Application Priority Data

Nov. 30, 2012    (KR) .......................... 10-2012-0138410

(51) Int. Cl.
*G01S 5/04*    (2006.01)
*G01S 5/02*    (2010.01)
*G01S 3/40*    (2006.01)

(52) U.S. Cl.
CPC ....................... *G01S 3/40* (2013.01)

(58) Field of Classification Search
CPC .................................. G01S 3/12; G01S 3/14
USPC ............... 342/386, 417, 419, 443; 340/539.1, 340/539.13
See application file for complete search history.

(56) References Cited

U.S. PATENT DOCUMENTS

2008/0198003 A1* 8/2008 Nix .......................... G01S 3/40
340/539.13
2011/0018708 A1   1/2011 Piltonen et al.

FOREIGN PATENT DOCUMENTS

| KR | 10-2000-0072645 A | 12/2000 |
| KR | 10-2003-0016040 A | 2/2003 |
| KR | 10-2007-0042800 A | 4/2007 |
| KR |    10-0912251 B1  | 8/2009 |
| KR |    10-0971772 B1  | 7/2010 |
| KR | 10-2011-0022874 A | 3/2011 |
| KR | 10-2011-0081458 A | 7/2011 |

* cited by examiner

*Primary Examiner* — Dao Phan
(74) *Attorney, Agent, or Firm* — LRK Patent Law Firm

(57) ABSTRACT

An apparatus and method for estimating the direction of an RF signal is provided. The apparatus includes an antenna for receiving an RF signal. An electronic compass is configured to, as a pointing direction of the antenna is varied, generate information about pointing directions and pointing angles corresponding to variations in the pointing direction of the antenna. A control unit determines RSSI values at respective pointing angles of the antenna based on a received signal of the antenna and information of the electronic compass depending on the variations, extracts a maximum RSSI value from the RSSI values at respective pointing angles, and stores the maximum RSSI value and a pointing direction corresponding to the maximum RSSI value. A display unit displays the RSSI values at the respective pointing angles and a trajectory of the RSSI values at respective pointing angles under control of the control unit.

16 Claims, 5 Drawing Sheets

APPARATUS AND METHOD FOR ESTIMATING DIRECTION OF RADIO FREQUENCY SIGNAL

CROSS REFERENCE TO RELATED APPLICATION

This application claims the benefit of Korean Patent Application No. 10-2012-0138410, filed on Nov. 30, 2012, which is hereby incorporated by reference in its entirety into this application.

BACKGROUND OF THE INVENTION

1. Technical Field

The present invention relates generally to an apparatus and method for estimating the direction of a Radio Frequency (RF) signal and, more particularly, to an apparatus and method that estimate the direction of an RF signal emitted from any transmission device, which is a target, the direction of which is to be estimated, using a directional antenna and an electronic compass.

2. Description of the Related Art

Technology related to the estimation of a direction of an RF signal includes a method based on the strength of signals using an RF reception device, a method using the strengths and phases of signals, a method using the results of a comparison between the strengths or phases of signals at multiple antennas or multiple measurement points, etc.

In fields of radio wave management, national defense, or the like, precise direction-finding performance is required, so an antenna having excellent characteristics for respective bands, a high-sensitive reception device, and a direction-finding algorithm including procedures for correcting various types of measurement data and processing signals must be implemented. In more detail, a typical direction-finding algorithm is configured such that two or more antennas, such as a loop antenna and a dipole antenna, are arranged, and the amplitudes and phases of RF signals received through the respective antennas are extracted, and such that an accurate arrival direction of the RF signals is calculated using a super-resolution algorithm, such as a correlative vector, Multiple Signal Classification (MUSIC), or Maximum Likelihood (ML).

Generally, a typical method is configured such that an analog reception device receives an RF signal and converts the RF signal into a specific Intermediate Frequency (IF) Analog/Digital conversion (ADC) is performed on the IF signal, Fast Fourier Transform (FFT) is performed on a digital signal, and the amplitude and phase of a resulting signal are extracted, and then the above-described direction-finding algorithm is applied. Such a typical method may be regarded as an algorithm using digital signal processing. An algorithm using such digital signal processing is configured such that an exclusive device and software capable of converting, calculating and determining data measured in a detection area must be implemented in detection equipment.

Meanwhile, in illegal signal detection sites requiring, immediate direction estimation via simple measurement in an indoor space, an intuitive direction estimation scheme based on a comparison between the strengths of received signals depending on the pointing direction of an antenna may have advantages from the standpoint of reduction in the complexity of the implementation of a detection system and a user's convenience, compared to the above-described algorithm based on digital signal processing. However, in an indoor environment, the propagation of electromagnetic waves generally has characteristics in which reflective waves obtained through multiple paths coexist due to a wall, a ceiling, a floor, furniture, etc., thus increasing a false detection rate when a direction is estimated.

Related prior technologies include Korean Patent Registration No. 1071202 (entitled "Apparatus and method fix finding the direction of a broadband signal"). The apparatus disclosed in Korean Patent Registration No. 1071202 includes a broadband reception unit, a data extraction unit, a FFT execution unit, and a direction-finding unit. The broadband reception unit receives a broadband signal via an antenna, extracts one or more narrowband signals from the broadband signal, converts the frequency of the extracted narrowband signals, and then outputs IF signals. The data extraction unit extracts Integer/Quadrature (IQ) data from the output IF signals through Analog/Digital (A/D) converters and Programmable Digital Down-converters provided for respective narrowband channels, and outputs the I/Q data. The FFT execution unit performs FFT on the output I/Q data and extracts the amplitudes or phases of the narrowband signals. The direction-finding unit executes a direction-finding algorithm using the extracted amplitudes or phases and simultaneously detects the arrival directions of the one or more narrowband signals. The technology disclosed in Korean Patent Registration No. 1071202 may receive a broadband signal, separate narrowband signals by executing FFT and then detect the directions of the narrowband signals, and may simultaneously detect directions regardless of the number of narrowband signals even if a limited number of antennas are used. The invention disclosed in Korean Patent Registration No. 1071202 is not intended to provide a portable direction-finding apparatus, and it is technology that focuses on direction-finding based on the execution of a direction-finding algorithm using two or more antennas and based on a data correction procedure or the like. Further, the invention disclosed in Korean Patent Registration No. 1071202 requires the implementation of hardware and software only for direction-finding required to extract I/Q data from IF signals and execute a direction-finding algorithm so as to realize precise direction-finding performance.

Another prior technology includes Korean Patent Registration No. 1174443 (entitled "Location determination apparatus"). The apparatus disclosed in Korean Patent Registration No. 1174443 includes an RF transmission unit and a portable location determination device. The RF transmission unit is installed in a vehicle and configured to transmit a signal. The portable location determination device includes a directional receiving antenna for receiving a signal from the vehicle which is a target, the location of which is to be determined, in a wireless manner, a reception strength detection unit for measuring the strength of the signal received through the directional receiving antenna, a geomagnetic sensor for detecting a direction in which the directional receiving antenna is disposed, and a display unit for displaying the strength of the signal measured by the reception strength detection unit. The portable location determination device is configured such that the display unit displays the direction in which the directional receiving antenna is disposed and which is detected by the geomagnetic sensor, together with the strength of the signal measured by the reception strength detection unit. Further, when the number of vehicles is two or more, and the directional receiving antenna receives a signal from any one of the two or more vehicles, information required to identify a target is further received, and the display unit displays information required to identify the vehicle together with the strength of the signal measured by the reception strength detection unit. In accordance with the invention disclosed in Korean Patent Registration No. 1174443, the location of an object requiring location determination may be determined using separate equipment or a mobile communication terminal. Such an invention disclosed in Korean Patent Registration No. 1174443 is intended to determine a location while performing radio communication with a transmitter previously installed in each vehicle or the like. Therefore, the invention premises radio communication between the target and the location determination device, thus enabling a direction to be detected only in a specific communication frequency band.

SUMMARY OF THE INVENTION

Accordingly, the present invention has been made keeping in mind the above problems occurring in the prior art, and an object of the present invention is to provide an apparatus and method for intuitively estimating the location of generation of RF signals emitted from any transmission device while a user carries the apparatus in an indoor space.

In accordance with an aspect of the present invention to accomplish the above object, there is provided an apparatus for estimating a direction of a RF signal, including an antenna for receiving an RF signal; an electronic compass for, as a pointing direction of the antenna is varied, generating information about pointing directions and pointing angles corresponding to variations in the pointing direction of the antenna; a control unit for determining RSSI values at respective pointing angles of the antenna based on a received signal of the antenna and information of the electronic compass depending on the variations in the pointing direction of the antenna, extracting a maximum RSSI value from the RSSI values at the respective pointing angles, and storing the maximum RSSI value and a pointing direction corresponding to the maximum RSSI value; and a display unit for displaying the RSSI values at the respective pointing angles and a trajectory of the RSSI values at the respective pointing angles under control of the control unit.

Preferably, the display unit may display the RSSI values at the respective pointing angles in a form of one or more of numerals, a bar graph, and polar coordinate plot.

Preferably, the display unit may display a pointing line indicating a pointing direction depending on movement of the antenna in a polar coordinate system.

Preferably, the apparatus may further include a mode setting unit for setting a start and an end of a mode in which an arrival direction of the RF signal is estimated, wherein the control unit is operated depending on settings by the mode setting unit.

Preferably, the display unit may be configured to, if the mode in which the arrival direction of the RF signal is estimated ends, display a trajectory of the RSSI values at the respective pointing angles obtained for a measurement time and a pointing line indicating a direction of the maximum RSSI value in a polar coordinate system.

Preferably, the control unit may be connected to a spectrum analyzer for receiving a received signal of the antenna through a cable and is configured to receive a plurality of RSSI values at each pointing angle from the spectrum analyzer, calculate an average of the RSSI values at the corresponding pointing angle, and determine the average to be an RSSI value at the corresponding pointing angle.

Preferably, the cable may include a cable body, an RF connector installed in one side of the cable body and configured to perform impedance matching with impedance of the antenna, and a data communication connector installed on one side of the cable body separately from the RF connector.

Preferably, the antenna may be implemented as a unidirectional antenna.

In accordance with another aspect of the present invention to accomplish the above object, there is provided an apparatus for estimating a direction of a RF signal, including an antenna for receiving an RF signal; an electronic compass for, as a pointing direction of the antenna is varied, generating information about pointing directions and pointing angles corresponding to variations in the pointing direction of the antenna; a digital signal processing unit for receiving the RF signal from the antenna and calculating a RSSI value corresponding to the RF signal; a control unit for determining RSSI values at respective pointing angles of the antenna corresponding to the variations in the pointing direction of the antenna based on the RSSI value from the digital signal processing unit and information of the electronic compass, extracting a maximum RSSI value from the RSSI values at the respective pointing angles, and storing the maximum RSSI value and a pointing direction corresponding to the maximum RSSI value; and a display unit for displaying the RSSI values at the respective pointing angles and a trajectory of the RSSI values at the respective pointing angles under control of the control unit.

Preferably, the control unit may receive a plurality of RSSI values at each pointing angle from the digital signal processing unit, calculate an average of the RSSI values at the corresponding pointing angle, and determine the calculated average to be an RSSI value at the corresponding pointing angle.

In accordance with a thither aspect of the present invention to accomplish the above object, there is provided a method of estimating a direction of a RF signal, including determining, by a control unit, RSSI values at respective pointing angles of an antenna, based on a received signal of the antenna and information of an electronic compass related to a pointing direction and a pointing angle of the antenna; extracting, by the control unit, a maximum RSSI value from the RSSI values at the respective pointing angles, and storing the maximum RSSI value and a pointing direction corresponding to the maximum RSSI value; and displaying, by a display unit, the RSSI values at the respective pointing angles and a trajectory of the RSSI values at the respective pointing angles.

Preferably, determining the RSSI values at the respective pointing angles of the antenna may include calculating an average of a plurality of RSSI values generated at each pointing angle of the antenna; and determining the calculated average to be an RSSI value at the corresponding pointing angle.

Preferably, displaying may be configured to display the RSSI values at the respective pointing angles in a form of one or more of numerals, a bar graph, and polar coordinate plot.

Preferably, displaying may be configured to display a pointing line indicating a pointing direction depending on movement of the antenna in a polar coordinate system.

Preferably, displaying may be configured to display a trajectory of the RSSI values at the respective pointing angles obtained for a measurement time and a pointing line indicating a direction of the maximum RSSI value in a polar coordinate system.

BRIEF DESCRIPTION OF THE DRAWINGS

The above and other objects, features and advantages of the present invention will be mote clearly understood from the following detailed description taken in conjunction with the accompanying drawings, in which.

DESCRIPTION OF THE PREFERRED EMBODIMENTS

Figure 1:
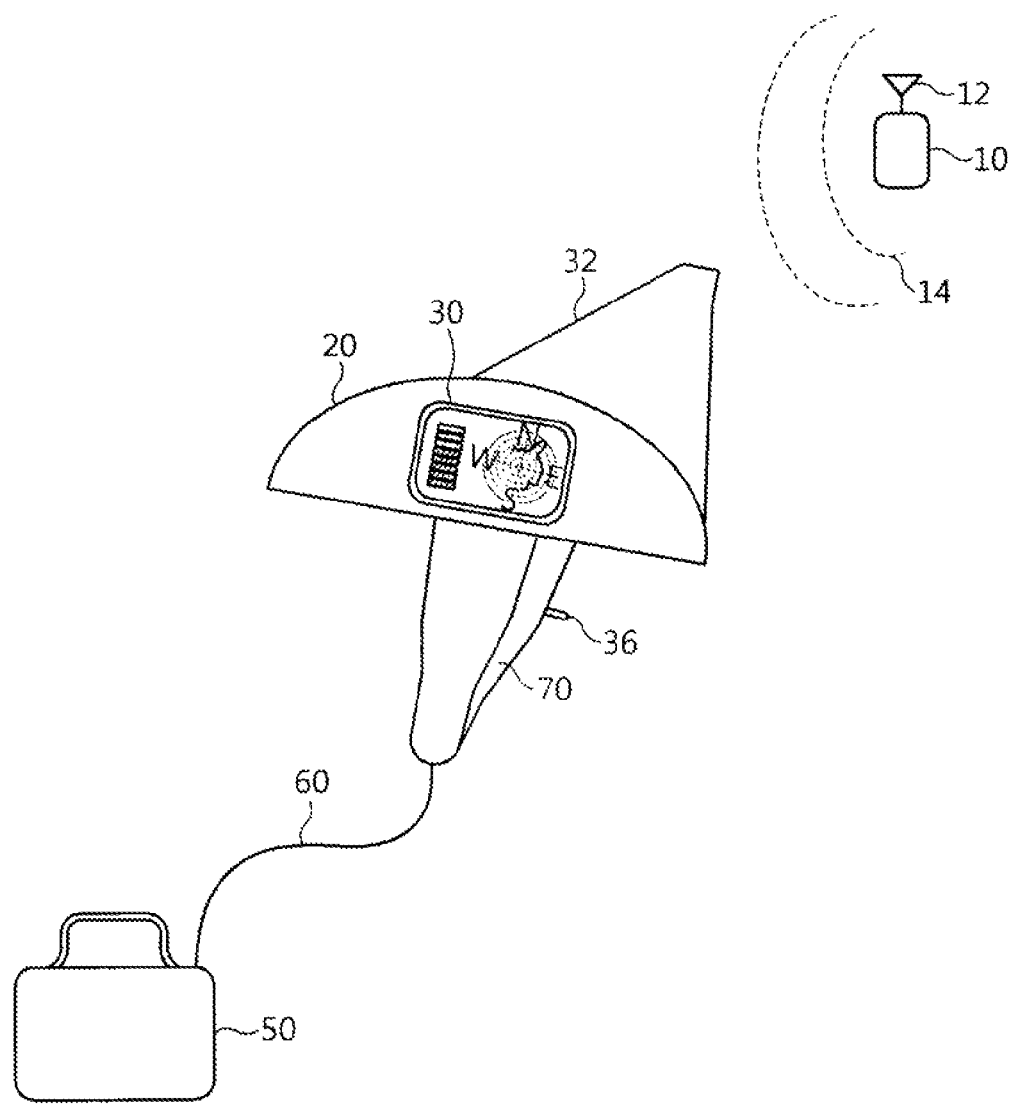
FIG. 1 is a diagram showing the configuration of an apparatus for estimating the direction of an RF signal according to an embodiment of the present invention.

The present invention is configured to utilize a uni-directional antenna and an electronic compass integrated with the structure of the antenna so as to overcome the inconvenience of replacing antennas for respective detection frequency bands when performing an illegal signal detection task for estimating the location of an illegal transmission device hidden in a specific place in an indoor space, and is configured to estimate the arrival direction of an RF signal without executing a separate direction-finding algorithm.

Hereinafter, an apparatus and method for estimating the direction of an RF signal according to an embodiment of the present invention will be described in detail with reference to the attached drawings. Prior to the detailed description of the present invention, it should be noted that the terms and words used in the present specification and the accompanying claims should not be limitedly interpreted as having their common meanings or those found in dictionaries. Therefore, the embodiments described in the present specification and constructions shown in the drawings are only the most preferable embodiments of the present invention, and are not representative of the entire technical spirit of the present invention. Accordingly, it should be understood that various equivalents and modifications capable of replacing the embodiments and constructions of the present invention might be present at the time at which the present invention was filed.

FIG. 1 is a diagram showing the configuration of an apparatus for estimating the direction of an RF signal according to an embodiment of the present invention.

An apparatus 30 for estimating the direction of an RF signal (hereinafter referred to as a "direction estimation apparatus 30") according to an embodiment of the present invention may be mounted on a structure, such as the reflective structure 20 of a directional antenna 32.

A user operates the direction estimation apparatus 30 by holding an antenna handle 70 and horizontally rotating the directional antenna 32 to the left or right for an RF signal 14 emitted from the transmitting antenna 12 of a target transmitter 10 in an arbitrary direction.

The direction estimation apparatus 30 is connected to the input port of an RF reception unit 52 (see FIG. 2) which is the part of a portable broadband spectrum analyzer 50 via an RF signal/data cable 60. When the direction estimation apparatus 30 is connected to the input port of the RF reception unit 52 (see FIG. 2), it may be supplied with power.

Figure 2:
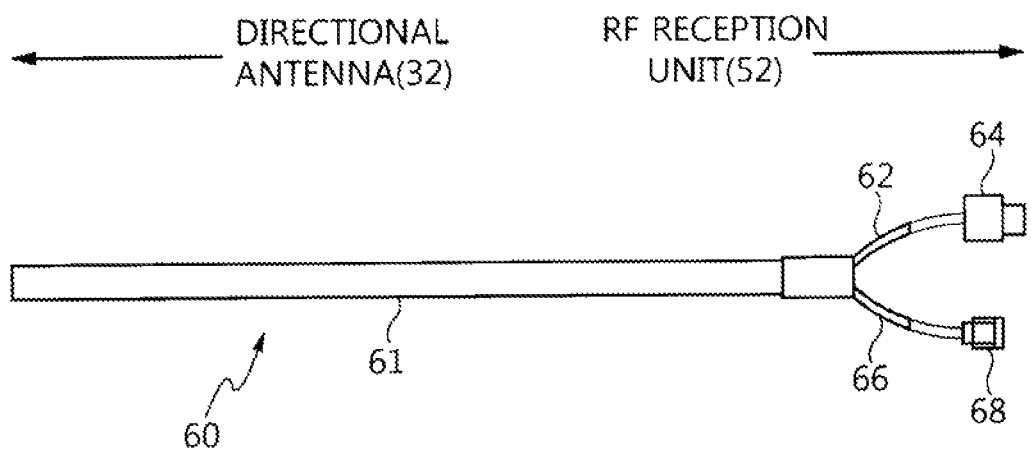
FIG. 2 is a diagram showing the configuration of the cable of FIG. 1.

FIG. 2 is a diagram showing the configuration of the cable 60 of FIG. 1.

The input port of the RF reception unit 52 of the portable broadband spectrum analyzer 50 receives an RF signal 14, which is received by the directional antenna 32, and receives a RSSI transmission command from the control unit 42 (see FIG. 3) of the direction estimation apparatus 30, through the RF signal/data cable 60. Of course, an RSSI value at the portable broadband spectrum analyzer 50 is transferred to the control unit 42 of the direction estimation apparatus 30 through the RF signal/data cable 60.

For this operation, the RF signal/data cable 60 includes a cable body 61, a micro coaxial (MCX)-type 50Ω RF connector 68 installed on one side of the cable body 61 and configured to perform impedance matching with the impedance of the directional antenna 32, and a mini Universal Serial Bus (USB)-type RS-232C data communication connector 64 installed on one side of the cable body 61 and installed separately from the RF connector 68. Here, the data communication connector 64 is installed at one end of the data cable 62 of the cable body 61, and the RF connector 68 is installed at one end of the 50Ω coaxial cable 66 of the cable body 61.

Figure 3:
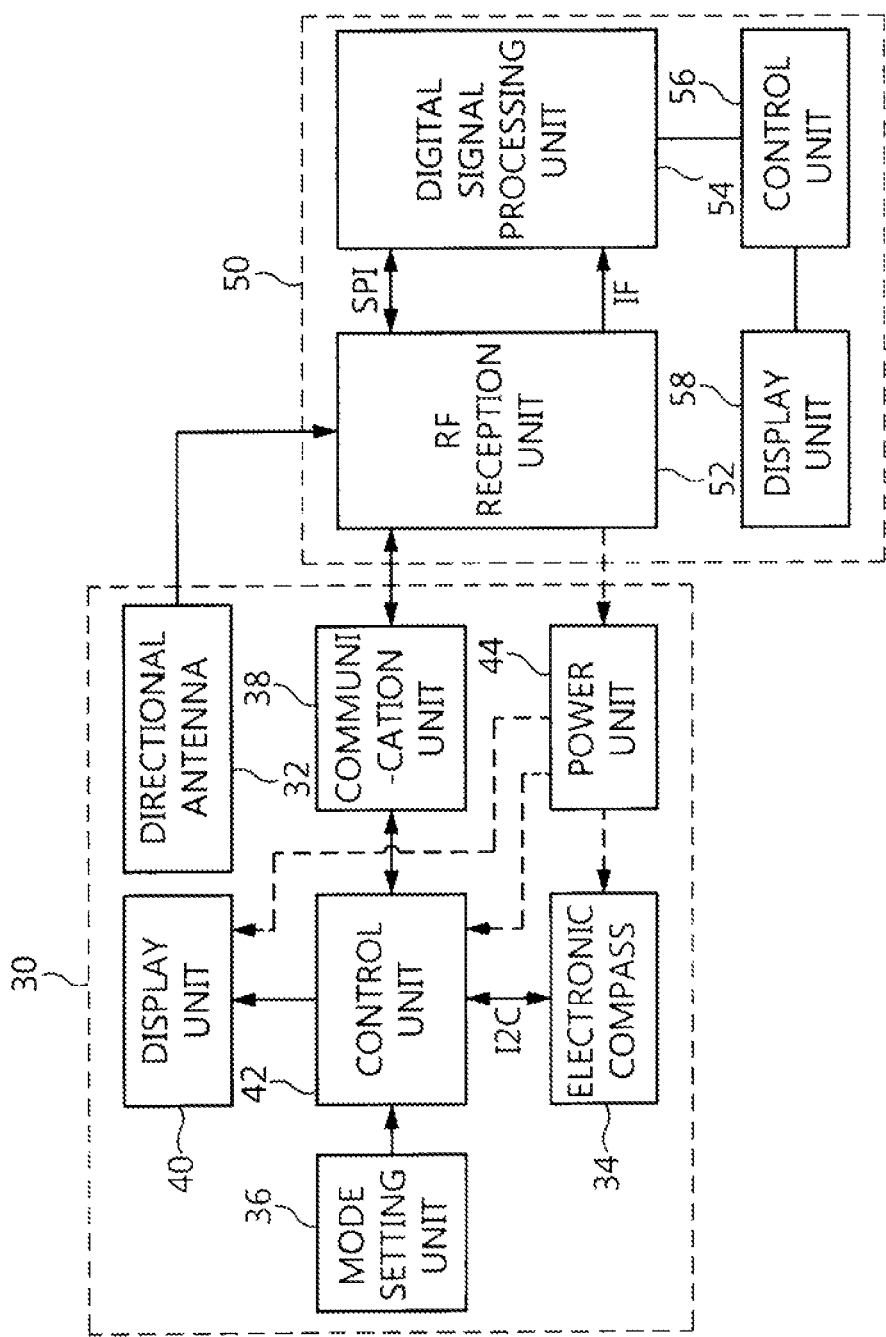
FIG. 3 is a diagram showing the internal configuration of an apparatus for estimating the direction of an RF signal according to an embodiment of the present invention.

FIG. 3 is a diagram showing the internal configuration of the apparatus for estimating the direction of an RF signal according to an embodiment of the present invention. In FIG. 3, the RF signal direction estimation apparatus according to the embodiment of the present invention is designated by reference numeral 30, and reference numeral 50 denotes a portable broadband spectrum analyzer. The direction estimation apparatus 30 according to the embodiment of the present invention is suitable for a portable simplified direction estimation device equipped with a small-sized directional antenna 32 and an electronic compass 34.

The direction estimation apparatus 30 includes a directional antenna 32, an electronic compass 34, a mode setting unit 36, a communication unit 38, a display unit 40, a control unit 42, and a power unit 44.

The directional antenna 32 is a single structure antenna having excellent front to back ratio (FBR) characteristics. The directional antenna 32 receives an RF signal 14 emitted from the transmitting antenna 12 of a target transmitter 10 in an arbitrary direction. The directional antenna 32 is an example of an antenna described in the accompanying claims of the present invention.

The electronic compass 34 is configured to, as the pointing direction of the directional antenna 32 is varied, to generate information about pointing directions and pointing angles corresponding to variations in the pointing direction of the directional antenna 32. Of course, the electronic compass 34 may generate information about an initial pointing direction and an initial pointing angle in a state in which the directional antenna 32 is not moved. The electronic compass 34 communicates with the control unit 42 in an Inter-Integrated (I2C) communication manner.

The mode setting unit 36 is used to set the start and end of a mode in which the arrival direction of the RF signal is estimated. Preferably, the mode setting unit 36 is implemented as a push button.

In an initial state in which the push button constituting the mode setting unit 36 is not pressed, a real-time RSSI value corresponding to the current pointing direction of the directional antenna 32 is displayed on the display unit 40. When the user presses the push button constituting the mode setting unit 36 (that is, starts the mode in which the arrival direction of an RF signal that is a detection target is estimated), RSSI values corresponding to variations in the pointing direction of the directional antenna 32 are stored in memory (not shown) included in the control unit 42, and an operation of calculating an average of N pieces of data for a specific designated rotation period is performed to minimize errors in RSSI values caused by the hand-shaking or the like of the user. The average is a representative value of RSSI values at the corresponding pointing angle. When the user presses the push button constituting the mode setting unit 36 once more (that is, ends the mode in which the arrival direction of the RF signal that is the detection target is estimated), an operation of displaying resulting values of direction information and RSSI for the measurement time (that is, representative values of RSSI at respective pointing angles) in the form of polar coordinates is performed.

In this way, the mode setting unit 36 is allocated to one port of the control unit 42 and may control the start and end of the mode under the control of the control unit 42 when the user operates the directional antenna 32 in a scan mode in which the directional antenna 32 is horizontally rotated to the right or left so as to measure RSSI values corresponding to pointing directions.

The communication unit 38 is configured to perform communication between the control unit 42 and the RF reception unit 52 of the portable broadband spectrum analyzer 50. Preferably, the communication unit 38 includes an RS-232 driver. The communication unit 38 transfers an RSSI data request command input from the control unit 42 to the RF reception unit 52, and also transfers RSSI data received from the RF reception unit. 52 to the control unit 42.

The display unit 40 displays RSSI values at respective pointing angles of the directional antenna 32 (that is, the averages of RSSI values at respective pointing angles) and the trajectory of the RSSI values (that is, the trajectory of RSSI values for respective directions of the RF signal) under the control of the control unit 42. That is, the display unit 40 receives the pointing directions and RSSI values of the directional antenna 32 and displays the pointing directions and the RSSI values in the form of numerals, a bar graph, polar coordinates, or the like. Further, the display unit 40 displays a pointing line indicating the pointing direction of the directional antenna 32 in a polar coordinate system. Preferably, the display unit 40 includes a Liquid Crystal Display (LCD) device.

The control unit 42 stores RSSI values at respective pointing angles of the directional antenna 32, based on the received signal of the directional antenna 32 and the information of the electronic compass 34 depending on variations in the pointing direction of the directional antenna 32. In more detail, the received signal of the directional antenna 32 is transmitted to a digital signal processing unit 54 via the RF reception unit 52 of the portable broadband spectrum analyzer 50. The digital signal processing unit 54 transmits RSSI corresponding to the received signal to the control unit 42. Therefore, the control unit 42 treats the RSSI as an RSSI value at the corresponding pointing angle. Here, since a plurality of RSSI values are generated at respective pointing angles, the control unit 42 stores the RSSI values at the respective pointing angles in the memory (not shown) of the control unit 42.

Further, the control unit 42 calculates the average of RSSI values at each pointing angle depending on variations in the pointing direction of the directional antenna 32 so as to minimize errors in RSSI values caused by the hand-shaking or the like of the user. The reason for calculating an average is given as follows. An RSSI value may be measured several times while the directional antenna 32 is moved by an interval identical to an angle resolution of the direction desired to be estimated, and then it is required to average the RSSI values. In the case of long-range direction-finding, as resolution is lower, a direction error may be reduced, but, in the case of short-range direction estimation in an indoor area, it is sufficient to perform estimation using a resolution of only about 1 to 2°. In contrast, in the indoor area, RSSI values seriously fluctuate depending on the surrounding reflective environment. Therefore, RSSI values measured during the movement of about 1 to 2° are averaged, and the average thereof is designated as a representative value of the RSSI values at the corresponding pointing angle. Consequently, when the user rotates the directional antenna 32, a representative value of the RSSI values at each pointing angle is represented as RSSI at the corresponding pointing angle in the polar coordinate system of the display unit 40.

When a command for ending the mode in which the arrival direction of the RF signal is estimated is received from the mode setting unit 36, the control unit 42 performs control such that results of direction information and RSSI values obtained for a measurement time are displayed on the display unit 40 in the form of polar coordinates.

Further, the control unit 42 extracts the maximum RSSI value from RSSI values at respective pointing angles (that is, RSSI values determined to be representative values of RSSI at corresponding pointing angles using average calculation), and stores the maximum RSSI value and a pointing direction corresponding thereto.

Of course, the control unit 42 may also extract the maximum RSSI value from the RSSI values at respective pointing angles, and estimate a pointing direction corresponding to the maximum RSSI value to be the arrival direction of a specific RF signal emitted from any transmission device. In greater detail, upon estimating the arrival direction of the RF signal, the control unit 42 may detect a pointing direction corresponding to the maximum RSSI value based on angle information received from the electronic compass 34 and may estimate the detected pointing direction to be the arrival direction of the specific RF signal emitted from any transmission device.

Preferably, the control unit 42 is implemented as a microcontroller.

The power unit 44 is supplied with Direct Current (DC) power from the power module (not shown) of the RF reception unit 52 of the portable broadband spectrum analyzer 50. In greater detail, the power unit 44 is supplied with DC power from the RF reception unit 52 of the portable broadband spectrum analyzer 50 as the direction estimation apparatus 30 is connected to the portable broadband spectrum analyzer 50. Further, the power unit 44 converts the supplied DC power into DC power required by the electronic compass 34, the display unit 40, and the control unit 42, and individually supplies the DC power to them.

Meanwhile, the portable broadband spectrum analyzer 50 includes the RF reception unit 52, the digital signal processing unit 54, a control unit 56, and a display unit 58.

The RF reception unit 52 converts an RF signal, emitted from any transmission device and received from the directional antenna 32, into a specific IF signal having a predetermined bandwidth.

The digital signal processing unit 54 A/D-converts the specific IF signal from the RF reception unit 52 into a digital value, and performs digital signal processing based on the digital value, thus calculating a precise RSSI value. For example, the digital signal processing unit 54 calculates the strength of the signal received from the directional antenna 32 in dBm. The results of the digital signal processing unit 54 may be displayed in the firm of a spectrum. Here, the calculated RSSI is transmitted to the direction estimation apparatus 30 after sequentially going through the control unit 56, the digital signal processing unit 54, and the RF reception unit 52 of the portable broadband spectrum analyzer 50. The RF reception unit 52 and the digital signal processing unit 54 may be operated using a Serial Peripheral interface (SPI) communication scheme.

The control unit 56 controls the overall operation of the portable broadband spectrum analyzer 50. As an RF signal that is a detection target is selected from the user interface (Graphical User Interlace: GUI) of the display unit 58, the control unit 56 transmits information about the selected detection target to the direction estimation apparatus 30.

The display unit 58 displays the RF signal that is the detection target so that the RF signal may be selected by the user on a spectrum using a peak or marker search function.

The RF reception unit 52 and the digital signal processing unit 54 of the above-described portable broadband spectrum analyzer 50 may be configured to be included in the direction estimation apparatus 30 if necessary. If the RF reception unit 52 and the digital signal processing unit 54 are included in the direction estimation apparatus 30, the control unit 42 of the direction estimation apparatus 30 may calculate RSSI values at respective pointing angles corresponding to variations in the pointing direction of the directional antenna 32 based on RSSI received from the digital signal processing unit 54 and the information of the electronic compass 34.

Figure 4:
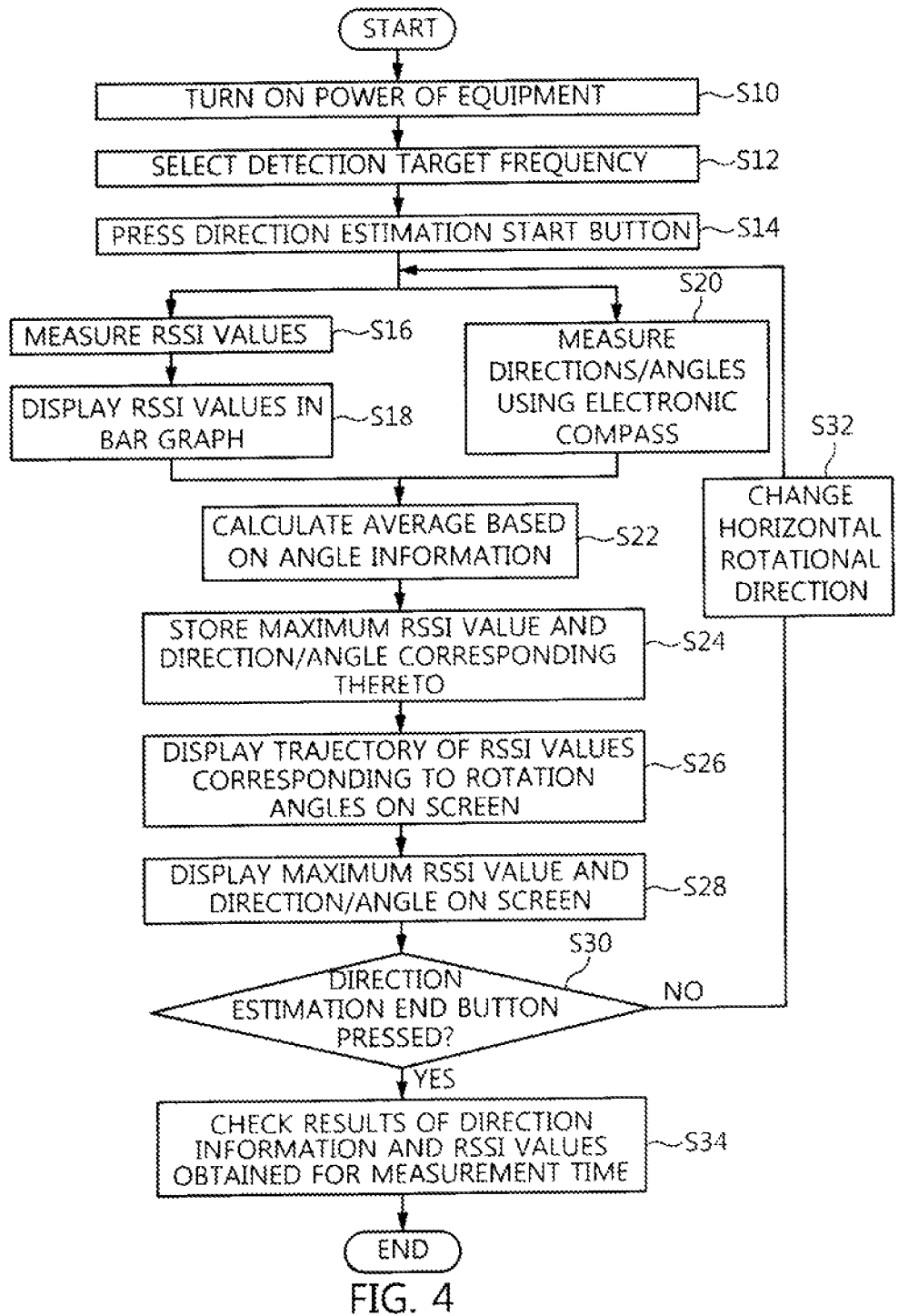
FIG. 4 is a flowchart showing a method of estimating the direction of an RF signal according to an embodiment of the present invention.

FIG. 4 is a flowchart showing a method of estimating the direction of an RF signal according to an embodiment of the present invention.

First a user turns on the power of the direction estimation apparatus 30 and the portable broadband spectrum analyzer 50 at step S10, and thereafter selects a detection target frequency at step S12. Here, the detection target frequency may be selected by the user using the function of searching for a peak or a marker on a spectrum displayed on the display unit 58 of the portable broadband spectrum analyzer 50. The direction estimation bandwidth of the detection target frequency is previously set by the portable broadband spectrum analyzer 50.

If such a preparation procedure has terminated, the power is supplied and a Received Signal Strength Indication (or indicator) (RSSI) value is transmitted through the MCX-type 50Ω RF connector 68 and the mini-USB type RS-232 communication connector 64 when the direction estimation apparatus 30 is connected to the RF reception unit 52.

Figure 5:
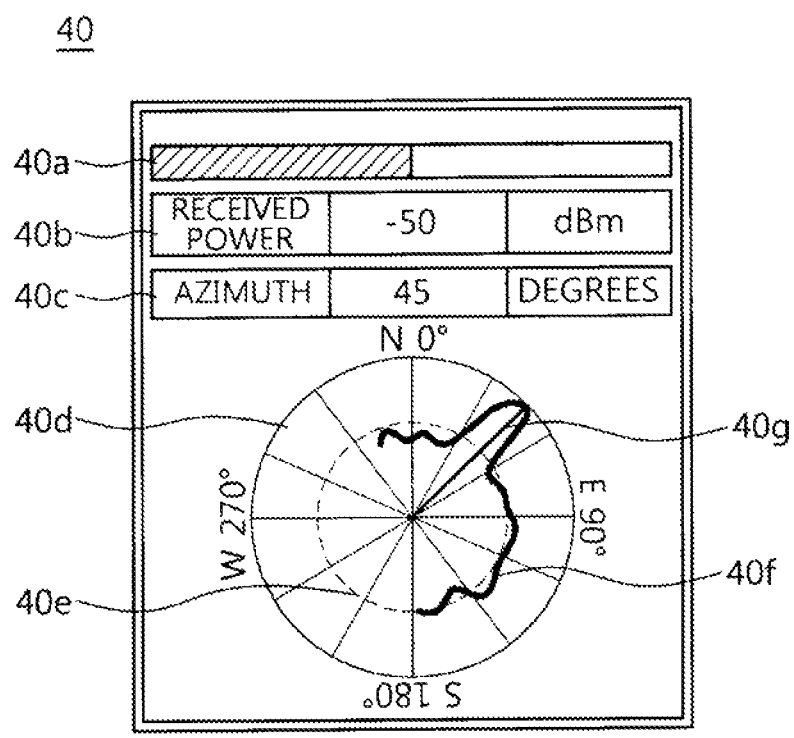
FIG. 5 is a diagram showing an example of a screen used in the description of embodiments of the present invention.

In an initial state in which the user does not manipulate the mode setting unit 36 of the direction estimation apparatus 30, real-time RSSI corresponding to the current pointing direction of the directional antenna 32 is displayed on the display unit 40 in the form of a bar graph (40a, set FIG. 5) and a numeral expressed in dBm (40b, see FIG. 5).

Thereafter, in order to estimate the direction of the detection target frequency, the user presses the push button of the mode setting unit 36 at step S14. As the push button is pressed, a signal corresponding thereto is applied to the control unit 42 of the corresponding direction estimation apparatus 30, and thus the control unit 42 recognizes that a direction estimation mode start.

In a state in which the direction estimation mode has started, if the user horizontally rotates the directional antenna 32 to the left or right at regular intervals, the control unit 42 of the direction estimation apparatus 30 receives a plurality of RSSI values generated at respective pointing angles from the digital signal processing unit 54 of the portable broadband spectrum analyzer 50 at step S16. In this case, the control unit 42 stores the received RSSI values at respective pointing angles in its own memory (not shown).

Thereafter, the control unit 42 of the direction estimation apparatus 30 displays the received RSSI values generated at the respective pointing angles on the display unit 40 in the form of a bar graph (40a, see FIG. 5) at step S18.

While steps S16 and S18 are being performed, the electronic compass 34 is configured to, as the pointing direction of the directional antenna 32 is varied, generate information about pointing directions and pointing angles corresponding to the variations at step S20. The electronic compass 34 transmits information about the pointing directions and the pointing angles corresponding to the variations in the pointing direction of the directional antenna 32 to the control unit 42 of the direction estimation apparatus 30.

Thereafter, in order to minimize an error in RSSI values caused by the hand-shaking or the like of the user, the control unit 42 calculates the average of RSSI values at each pointing angle corresponding to the variations in the pointing direction of the directional antenna 32 at step S22. The average is a representative value of RSSI values at the corresponding pointing angle, and the average (representative value) may be represented by the RSSI value at the corresponding pointing angle on the display unit 40.

Further, the control unit 42 extracts the maximum RSSI value from RSSI values at respective pointing angles (that is, RSSI values determined to be representative values of RSSI at the corresponding pointing angles using average calculation), and stores the extracted maximum RSSI value and a pointing direction and a pointing angle corresponding to the maximum RSSI value at step S24.

Together with these operations, the control unit 42 displays RSSI values corresponding to the rotation angles of the directional antenna 32 in the form of a trajectory 40f in the pole coordinate system 40d of the display unit 40 at step S26. Of course, even in this case, the control unit 42 may display the corresponding value on the bar graph 40a and the indication field 40b of the display unit 40.

Further, the control unit 42 displays the stored maximum RSSI value and the pointing direction and the pointing angle corresponding to the maximum RSSI value on the display unit 40 at step S28. In this case, for example, the maximum RSSI value is displayed as "−50 dBm" in the indication field 40b (see FIG. 5), the pointing direction corresponding to the maximum RSSI value is displayed as a pointing line (40g, see FIG. 5), and the pointing angle corresponding to the maximum RSSI value is displayed as "45°" in an indication field 40c (see FIG. 5).

Thereafter, the control unit 42 checks whether the user has pressed the push button of the mode setting unit 36 again at step S30.

If it is determined that the user has not pressed the push button of the mode setting unit 36 again (in case of "No" at step S30), the control unit 42 repeatedly performs the above procedure (including steps S16 to S30) as the horizontal rotational direction of the directional antenna 32 has changed at step S32.

In contrast if the user has pressed the push button of the mode setting unit 36 again (in case of "Yes" at step S30), the results of direction information and RSSI values obtained for the measurement time are finally displayed in the polar coordinate system at step S34. That is, when the user starts the direction estimation mode, the RSSI values at respective direction angles varying in real time with the horizontal rotation of the directional antenna 32 are displayed in the polar coordinate system or the like of FIG. 5. Also, even if the user ends the direction estimation mode, direction information and RSSI values at respective pointing males obtained for the measurement time of the estimation mode are displayed once more in the form of FIG. 5.

Accordingly, the user may check the results of direction information and RSSI values at the respective pointing angles obtained for the measurement time once more.

In the above-described embodiments of the present invention, if the directional antenna 32 is horizontally rotated even before the mode in which the arrival direction of an RF signal is estimated ends. RSSI values at respective pointing angles and the trajectory of the RSSI values are displayed in real time on the display unit 40. However, if the mode in which the arrival direction of an RF signal is estimated ends, the trajectory of RSSI values (including the maximum RSSI value) at respective pointing angles obtained for the measurement time and a pointing line indicating the direction of the maximum RSSI value may be checked once more, as shown in the polar coordinates system 40d of FIG. 5.

FIG. 5 is a diagram illustrating a screen on which the results of direction estimation are displayed according to an embodiment of the present invention, in FIG. 5, reference, numeral 40a denotes a bar graph indicating RSSI, reference numeral 40b denotes an indication field in which received power is displayed, reference numeral 40c denotes an indication field indicating azimuth, reference numeral 40d denotes a polar coordinate system indicating the pointing direction and RSSI of the directional antenna 32, reference numeral 40e denotes contour lines indicating the levels of RSSI, reference numeral 40f denotes the trajectory of a received signal depending on the pointing direction of the directional antenna 32, and reference numeral 40g denotes a pointing line indicating the pointing direction of the directional antenna 32.

When the user presses once the push button of the mode setting unit 36 and then horizontally rotates the directional antenna 32 to the left or right, the pointing line 40g indicating the pointing direction of the antenna is moved. By means of this, it can be intuitively estimated that the pointing direction of the directional antenna 32 matching a point at which the maximum RSSI value is observed in the polar coordinate system is the arrival direction of the RF signal 14 emitted from the target transmission device 10.

In accordance with the present invention having the above configuration, a user may immediately check the trajectory of RSSI values for respective directions of an RF signal obtained by horizontally rotating an antenna, thus rapidly and intuitively estimating the arrival direction of a target signal or the hidden location of a target transmitter.

Further, since the pointing direction of the antenna, the strength of a received signal, etc. may be intuitively observed using a display unit, the inconvenience of a conventional direction estimation scheme that uses an antenna equipped with only a normal compass and a spectrum analyzer, that is, the inconvenience of having to monitor the display screen of the spectrum analyzer so as to read RSSI values corresponding to respective measurement directions, may be overcome.

Furthermore, the present invention may scan a specific section or an entire area of 360° in real time without going through a conventional digital signal processing procedure, and thus an arithmetical probability of estimating the direction of a received signal may be improved by means of repetitive measurements. In addition, the present invention is advantageous in that real-time average calculation is performed on an error in signal strength caused by hand-shaking of the user when the user rotates the antenna in his or her hand in a portable operation situation in which a fixed holder cannot be used, so that the error is compensated for, and then the range of direction estimation errors may be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for estimating a direction of an RF signal, comprising:
    an antenna for receiving an RF signal;
    an electronic compass for, as a pointing direction of the antenna is varied, generating information about pointing directions and pointing angles corresponding to variations in the pointing direction of the antenna;
    a control unit for determining received signal strength indicator (RSSI) values at respective pointing angles of the antenna based on a received signal of the antenna and information of the electronic compass depending on the variations in the pointing direction of the antenna, extracting a maximum RSSI value from the RSSI values at the respective pointing angles, and storing the maximum RSSI value and a pointing direction corresponding to the maximum RSSI value;
    a display unit for displaying the RSSI values at the respective pointing angles and a trajectory of the RSSI values at the respective pointing angles under control of the control unit, and
    a mode setting unit for setting a start and an end of a mode in which an arrival direction of the RF signal is estimated,
    wherein the control unit is operated depending on settings by the mode setting unit.

2. The apparatus of claim 1, wherein the display unit displays the RSSI values at the respective pointing angles in a form of one or more of numerals, a bar graph, and polar coordinates.

3. The apparatus of claim 1, wherein the display unit displays a pointing line indicating a pointing direction depending on movement of the antenna in a polar coordinate system.

4. The apparatus of claim 1, wherein the display unit is configured to, if the mode in which the arrival direction of the RF signal is estimated ends, display a trajectory of the RSSI values at the respective pointing angles obtained for a measurement time and a pointing line indicating a direction of the maximum RSSI value in a polar coordinate system.

5. The apparatus of claim 1, wherein the control unit is connected to a spectrum analyzer for receiving a received signal of the antenna through a cable and is configured to receive a plurality of RSSI values at each pointing angle from the spectrum analyzer, calculate an average of the RSSI values at the corresponding pointing angle, and determine the average to be an RSSI value at the corresponding pointing angle.

6. The apparatus of claim 5, wherein the cable comprises a cable body, an RF connector installed in one side of the cable body and configured to perform impedance matching with impedance of the antenna, and a data communication connector installed on one side of the cable body separately from the RF connector.

7. The apparatus of claim 1, wherein the antenna is implemented as a uni-directional antenna.

8. An apparatus for estimating a direction of an RF signal, comprising:
    an antenna for receiving an RF signal;
    an electronic compass for, as a pointing direction of the antenna is varied, generating information about pointing directions and pointing angles corresponding to variations in the pointing direction of the antenna;
    a digital signal processing unit for receiving the RF signal from the antenna and calculating a RSSI value corresponding to the RF signal;
    a control unit for determining RSSI (Received Signal Strength Indicator) values at respective pointing angles of the antenna corresponding to the variations in the pointing direction of the antenna based on the RSSI value from the digital signal processing unit and information of the electronic compass, extracting a maximum RSSI value from the RSSI values at the respective pointing angles, and storing the maximum RSSI value and a pointing direction corresponding to the maximum RSSI value;

a display unit for displaying the RSSI values at the respective pointing angles and a trajectory of the RSSI values at the respective pointing angles under control of the control unit, and a mode setting unit for setting a start and an end of a mode in which an arrival direction of the RF signal is estimated, wherein the control unit is operated depending on settlings by the mode settings unit.

9. The apparatus of claim 8, wherein the control unit receives a plurality of RSSI values at each pointing angle from the digital signal processing unit, calculates an average of the RSSI values at the corresponding pointing angle, and determines the calculated average to be an RSSI value at the corresponding pointing angle.

10. The apparatus of claim 8, wherein the display unit displays the RSSI values at the respective pointing angles in a form of one or more of numerals, a bar graph, and polar coordinate plot.

11. The apparatus of claim 8, wherein the display unit displays a pointing line indicating a pointing direction depending on movement of the antenna in a polar coordinate system.

12. The apparatus of claim 8, wherein the display unit is configured to, if the mode in which the arrival direction of the RF signal is estimated ends, display a trajectory of the RSSI values at the respective pointing angles obtained for a measurement time and a pointing line indicating a direction of the maximum RSSI value in a polar coordinate system.

13. A method of estimating a direction of an RF signal, comprising:

determining, by a control unit, RSSI (Received Signal Strength Indicator) values at respective pointing angles of an antenna, based on a received signal of the antenna and information of an electronic compass related to a pointing direction and a pointing angle of the antenna;

extracting, by the control unit, a maximum RSSI value from the RSSI values at the respective pointing angles, and storing the maximum RSSI value and a pointing direction corresponding to the maximum RSSI value; and displaying, by a display unit, the RSSI values at the respective pointing angles and a trajectory of the RSSI values at the respective pointing angles, wherein the determining RSSI values at respective pointing angles of an antenna comprises:

calculating an average of a plurality of RSSI values generated at each pointing angle of the antenna; and determining the calculated average to be an RSSI value at the corresponding pointing angle.

14. The method of claim 13, wherein the displaying is configured to display the RSSI values at the respective pointing angles in a form of one or more of numerals, a bar graph, and polar coordinates.

15. The method of claim 13, wherein the displaying is configured to display a pointing line indicating a pointing direction depending on movement of the antenna in a polar coordinate system.

16. The method of claim 13, wherein the displaying is configured to display a trajectory of the RSSI values at the respective pointing angles obtained for a measurement time and a pointing line indicating a direction of the maximum RSSI value in a polar coordinate system.

* * * * *